(12) United States Patent
Byun et al.

(10) Patent No.: US 11,700,969 B2
(45) Date of Patent: Jul. 18, 2023

(54) BEVERAGE MACHINE WITH A COLLAPSIBLE INTERFACE

(71) Applicant: SOCIETE DES PRODUITS NESTLE S.A., Vevey (CH)

(72) Inventors: Da Mi Byun, Lausanne (CH); Bertrand Guyon, Pontarlier (FR); Marco Magatti, Lausanne (CH); Eric Meyer, Pully (CH); Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 654 days.

(21) Appl. No.: 16/617,699

(22) PCT Filed: May 30, 2018

(86) PCT No.: PCT/EP2018/064138
§ 371 (c)(1),
(2) Date: Nov. 27, 2019

(87) PCT Pub. No.: WO2018/219984
PCT Pub. Date: Dec. 6, 2018

(65) Prior Publication Data
US 2020/0178721 A1    Jun. 11, 2020

(30) Foreign Application Priority Data
Jun. 1, 2017    (EP) .................................... 17173873

(51) Int. Cl.
*A47J 31/36*    (2006.01)
*A47J 31/44*    (2006.01)

(52) U.S. Cl.
CPC ....... *A47J 31/3676* (2013.01); *A47J 31/4403* (2013.01)

(58) Field of Classification Search
CPC .......................... A47J 31/3676; A47J 31/4403
See application file for complete search history.

(56) References Cited

U.S. PATENT DOCUMENTS 8,146,485 B2 *   4/2012   Ozanne .................. A47J 31/36
                                                             99/283
8,424,448 B2     4/2013   Englert et al.
(Continued)

FOREIGN PATENT DOCUMENTS

CN     101507577 A    8/2009
CN     202146216 U    2/2012
(Continued)

OTHER PUBLICATIONS

China Patent Office Communication for Application No. 201880035783. 3, dated Mar. 3, 2022, 22 pages.

*Primary Examiner* — Brian W Jennison
*Assistant Examiner* — Abigail H Rhue
(74) *Attorney, Agent, or Firm* — K&L Gates LLP (57) ABSTRACT

A machine (1) for preparing and dispensing a beverage has an outside housing (30) having one or more outside faces (30*a*, 30*b*, 30*c*, 30*d*). The machine includes a user-interface device (31) movable from: a deployed operative position adjacent to a face (30*a*) of such one or more outside faces (30*a*, 30*b*, 30*c*) so that the device (31) is accessible by a user; to a retracted storage position in the outside housing (30). The user-interface device (31) is movable from its deployed operative position into its retracted storage position and vice versa along a first direction (31') and a second direction (31") that is non-parallel to the first direction (31').

17 Claims, 5 Drawing Sheets

(56) References Cited

U.S. PATENT DOCUMENTS

| | | | |
|---|---|---|---|
| 9,016,189 B2 | 4/2015 | Ullmann et al. | |
| 9,661,950 B2 * | 5/2017 | Agon | A47J 31/3633 |
| 9,664,264 B2 * | 5/2017 | Kristlbauer | A47J 31/407 |
| 10,849,456 B2 * | 12/2020 | Branko | A47J 31/525 |
| 2005/0172821 A1 * | 8/2005 | Chen | A47J 31/0668 |
| | | | 99/279 |
| 2007/0000944 A1 | 1/2007 | Cahen et al. | |
| 2009/0308259 A1 | 12/2009 | Hiron | |
| 2011/0185906 A1 * | 8/2011 | Winkler | A47J 31/44 |
| | | | 99/279 |
| 2013/0247772 A1 * | 9/2013 | Agon | A47J 31/5255 |
| | | | 99/285 |
| 2015/0107460 A1 | 4/2015 | Wilson | |
| 2017/0367523 A1 | 12/2017 | Granger et al. | |

FOREIGN PATENT DOCUMENTS

| | | |
|---|---|---|
| CN | 104188541 A | 12/2014 |
| CN | 105595939 A | 5/2016 |
| CN | 106108655 A | 11/2016 |
| EP | 2386229 | 11/2011 |
| EP | 2436288 31 | 5/2014 |
| WO | 2012072761 | 6/2012 |
| WO | 2013149937 | 10/2013 |
| WO | 2016083484 A1 | 6/2016 |
| WO | 2016083488 | 6/2016 |
| WO | 2017001367 | 1/2017 |
| WO | 2017037215 | 3/2017 |

\* cited by examiner

BEVERAGE MACHINE WITH A COLLAPSIBLE INTERFACE

CROSS REFERENCE TO RELATED APPLICATIONS

The present application is a National Stage of International Application No. PCT/EP2018/064138, filed on May 30, 2018, which claims priority to European Patent Application No. 17173873.5, filed on Jun. 1, 2017, the entire contents of which are being incorporated herein by reference

FIELD OF THE INVENTION

The field of the invention pertains to beverage preparation machines provided with a collapsible interface, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

It is also known to make portable machines for preparing beverage, for instance as disclosed in U.S. Pat. No. 6,739, 241, WO 99/02081, WO 2006/102980, US 2007/0199452, WO 2009/092746, EP 1 686 879 and WO 2011/131595.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule. The actuation of the movable part of the brewing device may be manual as disclosed in WO 2009/ 043630, WO 01/15581, WO 02/43541, WO 2010/015427, WO 2010/128109, WO 2011/144719 and WO 2012/032019. Various handle configurations are disclosed in EP 1867260, WO 2005/004683, WO WO2007/135136, WO 2008/ 138710, WO 2009/074550, WO 2009/074553, WO 2009/ 074555, WO 2009/074557, WO 2009/074559, WO 2010/ 037806, WO 2011/042400, WO 2011/042401 and WO 2011/144720. Integrations of such arrangements into beverage machines are disclosed in WO 2009/074550, WO2011/144719, EP2014195046, EP2014195048 and EP2014195067.

The actuation of the movable part of the brewing device may be motorized. Such a system is for example disclosed in WO 2012/025258, WO 2012/025259, WO 2013/127476 and EP 1 767 129. In this latter disclosure, the brewing device has a capsule insertion passage provided with a safety door assembled to the movable part of the brewing device via a switch for detecting an undesired presence of a finger in the passage during closure. Alternative covers for a capsule insertion passage are disclosed WO 2012/093107 and WO 2013/127906.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO99/50172, WO 2004/030435, WO 2004/ 030438, WO 2006/063645, WO 2006/090183, WO 2007/ 003062, WO 2007/003990, WO 2008/104751, WO 2008/ 138710, WO 2008/138820, WO 2010/003932, WO 2011/ 144720 and WO 2012/032019.

WO 2007/141334 and WO 2008/006682 disclose a beverage dispensing machine with a beverage preparation module that is movable relative to a base station.

WO 2006/050881 discloses a milk frother that has a dispensing head for dispensing the frother milk. The dispensing head is retractable inside the forther's housing for the time needed at the end of a dispensing cycle to perform a cleaning cycle of the dispensing head. WO 2009/043630 and PCT/EP16/070680 disclose a beverage machine with a dispensing head that is movable into and out of the machine's external casing. PCT/EP16/070685 discloses a beverage machine with a user-interface that is movable into and out of the machine's external casing.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . For instance, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has an outside housing with one or more outside faces, such as one or more faces selected from a top face, a side face, a rear face and a front face.

The machine include a user-interface device, e.g. connected to a control unit of such machine, movable from: a deployed operative position adjacent to a face of such one or more outside faces so that the device is accessible by a user for operating such machine to prepare and dispense the beverage; to a retracted storage position in the outside housing so that the device is inaccessible to a user for operating such machine; and/or vice versa.

For instance, the device bears one or more interface elements, such as touch elements, e.g. a button(s) or a touch pad or a touch screen, and/or one or more user indicators, e.g. light means e.g. LED or signal screen.

The user-interface device is movable, e.g. manually and/or automatically, from its deployed operative position into its retracted storage position and vice versa along a first direction and a second direction that is non-parallel to the first direction. Optionally the user-interface device can be moved along third direction that is non-parallel to the first and/or the second direction(s).

Hence, the user-interface device can be configured to be retracted when it does not need to be accessible and can be deployed when used, in a flexible manner. The orientation of the interface device can be changed between the deployed and retracted positions and/or the interface device in the deployed position can be off-set vis-à-vis its position in the retracted position. It follows that the movement and orientation of the interface device can be adapted to the overall configuration of the machine so as to best fit ergonomic and/or dimensional objectives.

The machine can have a deployed configuration for use (preparing and dispensing beverage) and a compacted configuration for storage (e.g. non-use and/or displacement of the machine).

The user-interface device may be secured in its deployed and/or its retracted positions such that it remains immobile in the machine under the effect of its own weight when exposed to gravity in any orientation of the machine.

The user-interface device can be configured to be secured in its operative and/or storage positions by at least one of: a friction and/or magnetic force, clipping arrangement and locking arrangement.

The user-interface device may be configured to interrupt powering of the machine when in or moved into the storage position. For instance, the machine has a power unit configured to power one or more activatable units and comprises a main switch that is directly or indirectly actuated by the user-interface device. The activatable units may include at least one of the user-interface device, a liquid drive, a thermal conditioner and a control unit.

The thermal conditioner may be a boiler or a thermoblock or an on demand heater (ODH), for instance an ODH type disclosed in EP 1 253 844, EP 1 380 243 and EP 1 809 151.

Examples of liquid drivers e.g. pumps and their incorporation into beverage machines are disclosed in WO 2009/150030, WO 2010/108700, WO 2011/107574 and WO 2013/098173.

The first direction may follow a movement of the user-interface device generally sinking into and emerging from the outside housing. For example, the first direction is generally orthogonal to the housing outside face that is adjacent to the device in its operative position or at an angle to such outside face that is in the range of 45 to 90 deg., such as 60 to 90 deg., e.g. 75 to 90 deg. The second direction can follow a movement of the user-interface device hiding behind and along the housing outside face that is adjacent to the user-interface device in its deployed operative position. For example, the second direction is generally parallel to the outside face that is adjacent to device in its operative position or at an angle to such outside face that is in the range of 0 to 45 deg., such as 0 to 30 deg., e.g. 0 to 15 deg.

The first direction can be at a large angle relative to a main outside face of the user-interface device in its deployed operative position, for instance a large angle in the range of 45 to 90 deg., such as a large angle of at least 60 deg., e.g. a large angle of at least or 75 or 85 deg. The second direction may be at a small angle relative to a main outside face of the user-interface device in its deployed operative position, for instance a small angle in the range of 0 to 45 deg., such as a small angle of less than 30 deg., e.g. a small angle of at less than 15 or 5 deg.

The user-interface device in its deployed operative position may have a main outside face that is generally flush with the housing outside face that is adjacent to the user-interface device. The device's main outside face in the deployed operative position can be predominantly surrounded, e.g. entirely surrounded, by housing outside faces that are flush with the device's main outside face.

The user-interface device can be guided from its deployed operative position into its retracted storage position and vice versa by a cam-follower and cam arrangement. The cam may have a first section extending along the first direction and a second section extending along the second direction.

The user-interface device may be associated with a pair of cams having different, sequentially off-set, profiles such that when the user-interface device is moved from the operative to the storage positions it has a front edge that is lowered and displaced underneath the outside housing while a rear edge of the device, uncovered by the outside housing, remains above the front edge during a part of a movement of the user-interface device between the operative and the storage positions.

The user-interface device may be coupled to a further machine part, e.g. a dispensing head with a beverage outlet, that is movable between an operative position and a storage position together with the user-interface device. The user-interface device can be for instance actuated by the further machine part or vice versa.

The user-interface device and the further machine part may be coupled together by a rigid or an articulated arrangement, such as a cam-follower and cam arrangement or a flexible mechanically connector or by a lever arrangement.

The further machine part may be a dispensing head with a beverage outlet that is movable between an operative dispensing position in which the outlet is positioned above a dispensing surface for positioning a user-cup or user-mug.

A dispensing surface can be formed by: an external placement support for placing such machine in position for preparing and dispensing the beverage; and/or a user-recipient support device of such machine, optionally the user-recipient support device being movable or removable from under the outlet, such as separable from a module of the machine and storable in a storage seat of the machine e.g. of such module. For example, such support device is storable in the storage seat and secured therein by at least one of: friction and/or magnetic force between the seat and the support device; clipping or locking the support device in the seat; and covering the seat by at least one of a door, gate, housing cover e.g. a cocoon-type half shell, carrying handle and belt.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198712, EP 2014198710 and EP 2014198715.

The further machine part may include an ingredient holder, such as an ingredient supply seat e.g. a water tank or an ingredient mixing unit.

The ingredient holder may form a seat of an ingredient processing unit of the machine, e.g. a seat formed by a chamber.

The ingredient holder can be connected to a liquid circuit comprising at least one of:
- a liquid supply arrangement, such as a main reservoir and an auxiliary reservoir fluidically connected by a liquid connector or a main reservoir and a connector to a liquid supply line;
- a liquid driver, such as an electric pump e.g. a solenoid pump, a rotary pump, a diaphragm pump, a positive displacement pump or a peristaltic pump, for driving liquid to the outlet;
- a thermal conditioner such as a liquid heater and/or cooler, for thermally conditioning liquid delivered by the outlet; and
- one or more liquid ducts for guiding liquid to be delivered by the outlet.

The processing unit can have a first module and a second module that are movable relatively to each other by an actuator between:
- a distant configuration for inserting into the seat and/or removing from the seat, e.g. towards a waste ingredient collector, an ingredient, e.g. a flavouring ingredient supplied within a capsule into the seat for instance via an ingredient supply channel; and
- a proximate configuration for processing the ingredient in the seat.

The actuator can comprise at least one of:
- an automatic actuator, e.g. a motor such as an electric motor;
- a semi-automatic actuator, e.g. a return-spring arrangement for automatically returning the first and second modules either into their distant configuration or into their proximate configuration; and
- a user-handle, such as a handle that is connected to at least one of the first and second modules and that actuates at least one of the modules by moving the handle from a first position to a second position, optionally, in the operative position of the further machine part, the handle in at least one of its first and second positions being flush with at least one of the outside housing and the user-interface device.

For instance, the actuator is connected to at least one of the first and second modules by a transmission that comprises at least one of a belt transmission, a gear transmission, e.g. a toothed gear transmission, and a lever transmission.

Examples of suitable waste ingredient collectors for carrying out the present invention are disclosed in EP 1867260, WO 2009/074559, WO 2009/135869, WO 2010/128109, WO 2011/086087 and WO 2011/086088.

Examples of suitable mixing unit with first and second modules that are relatively moved by a motor are disclosed in EP 1767129, WO 2012/025258, WO 2012/025259, WO 2013/127476 and WO 2014/056641. The first module and the second module of the mixing unit can be relatively movable generally along a longitudinal straight axis. Typically, the first and second modules of the mixing module are distant from each other in the transfer position and close to each other in the mixing position. In the mixing position, the first and second modules may define a mixing chamber, e.g. a chamber for receiving a plurality of beverage ingredients to be mixed together. In one embodiment, the mixing chamber is an infusion chamber in which infusible ingredients, e.g. coffee or tea, are exposed to a carrier liquid, such as water e.g. hot water. The mixing chamber may be configured to receive loose solid ingredient particles and/or to receive proportioned ingredients within a capsule. At least one part of the first and second modules may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis. The other part of these first and second parts may include an extraction plate, such as a plate provided with piercing elements for opening a flow-through face of the capsule or a non-intrusive plate for cooperating with a pre-opened or a self-opening flow-through face of the capsule. Self-opening capsules are for instance disclosed in CH 605 293 and WO 03/059778. The opening of capsules by a machine's piercing elements of a plate are for example disclosed in EP 512 470 and EP 2 068 684. Examples of suitable mixing modules with mixing chambers are disclosed in WO 2008/037642 and WO 2013/026843. A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second modules of the mixing units. When closed capsules are used, the first and second modules may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein. The interaction between the first and second modules (and optionally a capsule transfer channel) and an ingredient capsule may be of the type disclosed in WO 2005/004683, WO 2007/135135, WO2007/135136, WO 2008/037642 and WO 2013/026856. The machine may include a capsule loader associated with the transfer channel for loading a capsule. The capsule to be loaded may be of the type described above under the title "Field of the Invention" and/or the capsule may include an ingredient described under the same title. The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food. The capsule loader may have: a capsule holding configuration for holding an ingredient capsule away from the mixing unit; and a capsule releasing configuration for releasing the capsule in or into the transfer channel towards the mixing unit. The loader may have a capsule gate that is movable, such as pivotable and/or translatable, between a position obstructing the transfer channel for preventing a passage of the capsule along the channel and a position clearing the transfer channel for allowing a passage of the capsule along the channel. Details of suitable capsule loaders are disclosed in WO 2012/

126971, WO 2014/056641, WO 2014/056642 and WO 2015/086371. Details of suitable capsule sensing are disclosed in WO 2012/123440, WO 2014/147128, PCT/EP15/060555, PCT/EP15/060561, PCT/EP15/060567, PCT/EP15/065415 and PCT/EP15/065535.

The machine can have a power supply arrangement comprising a connector to an external power supply, such as an electric cord and/or plug connectable to the mains, and an internal power accumulator, such as a rechargeable battery, for powering the machine to prepare and dispense the beverage when the machine is not powered via the connector, the accumulator being optionally charged via the connector when connected to an external power supply.

The machine may include a docking station and a module disconnectably connected, and optionally mechanically assembled, to the docking station. The docking station and the module may include at least one of:
 a station ingredient supply such as a water tank and a module liquid connector connectable to the station ingredient supply; and
 a station connector to an external power supply, such as a station electric cord and/or plug connectable to the mains, and a module connector, e.g. a rigid connector stationary in the module, connectable to the station connector, e.g. a rigid connector stationary in the station.

The module may include an arrangement for preparing and dispensing the beverage.

The module may have a beverage outlet for dispensing a beverage to a beverage dispensing surface arranged for supporting a user-mug or a user-cup and a liquid circuit comprising at least one of:
 a liquid supply arrangement, such as a main reservoir fluidically disconnectably connectable by a liquid connector to the docking station, e.g. to a main reservoir and/or to a liquid supply line of the docking station;
 a liquid driver, such as an electric pump e.g. a solenoid pump, a rotary pump, a diaphragm pump, a positive displacement pump or a peristaltic pump, for driving liquid to the outlet;
 a thermal conditioner, such as a liquid heater and/or cooler, for thermally conditioning liquid delivered by the outlet; and
 one or more liquid ducts for guiding liquid to be delivered by the outlet.

The module may include at least one of: an internal power supply, such as a rechargeable battery; a connector to an external power supply, such as a module electric cord and/or plug connectable to the mains; a control unit for controlling the module and optionally functions contained in the docking station; and the interface device that is optionally connected, when present, to the control unit.

The machine can have one or more movable placement members for placing the machine, such as a module of such machine, onto an external, e.g. generally flat and/or horizontal, support surface in an orientation for preparing the beverage in the liquid circuit and delivering such beverage via the beverage outlet to the beverage dispensing surface.

The movable placement member(s) may have a deployed placement position for increasing a stability and/or safely placing the machine, e.g. such module, on the external support surface in an orientation for preparing and dispensing the beverage. For instance, the placement member(s) in the deployed placement position extend(s) away from the outside housing and/or extending laterally beyond at least one of the side face, rear face and front face.

The movable placement member(s) can have a retracted rest position within the outside housing or collapsed against the outside housing, e.g. collapsed against and extending along the outside housing, for:
 reducing a size of such machine, e.g. the module, to displace it; and/or
 provide a configuration suitable for placing the module onto a docking station of such machine and connecting the module to the docking station.

An incorporation of the placement member(s) in such machine may thus provide an overall size reduction when in the retracted rest position (e.g. for storing or displacing the machine) and/or provide a configuration suitable for placing a separable module (fitted with the placement member(s)) of the machine onto a docking station of such machine and connecting the module to the docking station, the module being placeable in the beverage preparation and dispensing orientation with the aid of the placement member(s) on an external support surface when not docked onto the docking station.

The placement member(s) can be pivotably and/or translationally mounted relative to the outside housing, for moving the placement member(s) from the deployed placement position to the retracted rest position and vice versa.

In the orientation for preparing the beverage in the liquid circuit and delivering such beverage via the beverage outlet to the beverage dispensing surface:
 the or at least one placement member in the deployed placement position may extend laterally beyond a housing outside face that extends upright above the placement member such as beyond the housing outside face by a horizontal distance of at least 3 mm such as in the range of 5 to 25 mm, e.g. 10 to 15 mm; and/or
 such machine has:
  an overall height extending from a bottom end of the deployed placement member to a top end of such machine; and
  an overall distance spacing a housing outside face extending upright above the placement member and a housing outside face facing the previous housing outside face,
 such that a ratio of the overall height/overall distance is of at least 1.3, such as at least 1.5, for instance at least 2, for example at 2.5, e.g. at least 3; and/or
 the outside housing has a bottom outside face adjacent to the or at least one placement member, the bottom outside face having a generally convex, biconvex, multi-convex or downwardly tapered shape, such as a generally rounded shape, e.g. cylindrical, spherical, ellipsoidal, ovoidal or conical shape, and/or such as generally polyhedral shape, e.g. prismatic or pyramidal shape.

The machine can have one or more stationary placement members for placing such machine, such as a module of such machine, onto an external, e.g. generally flat and/or horizontal, support surface. For instance, the machine has a stationary placement member protruding upright underneath such machine in an orientation for preparing and dispensing the beverage.

BRIEF DESCRIPTION OF THE DRAWINGS

The invention will now be described with reference to the schematic drawings, wherein.

DETAILED DESCRIPTION

Figure 1:
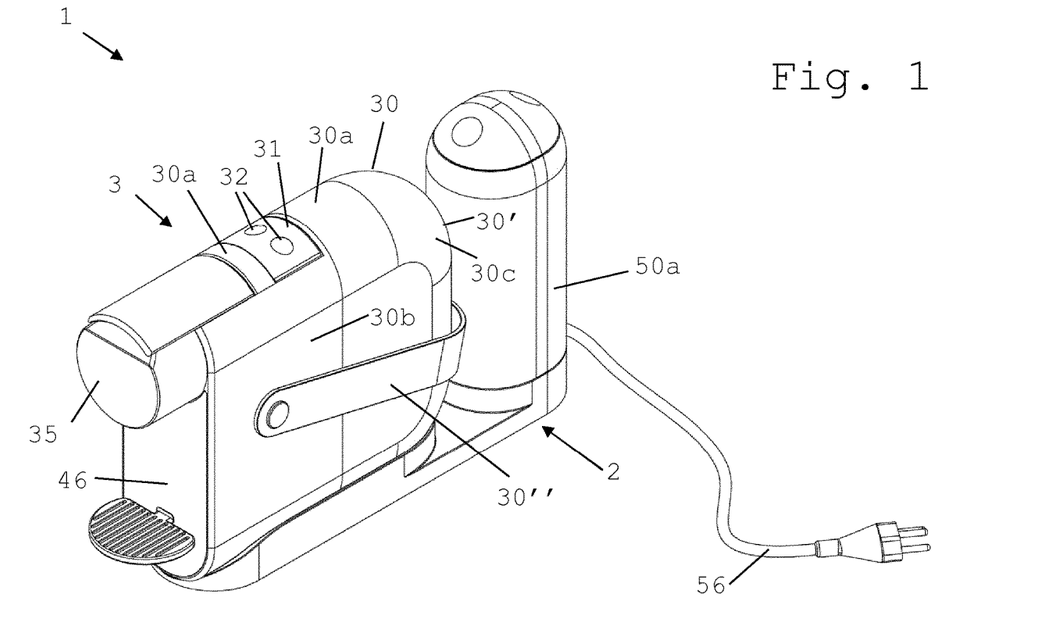
FIG. 1 is a perspective view of a machine in accordance with the invention.
Figure 2:
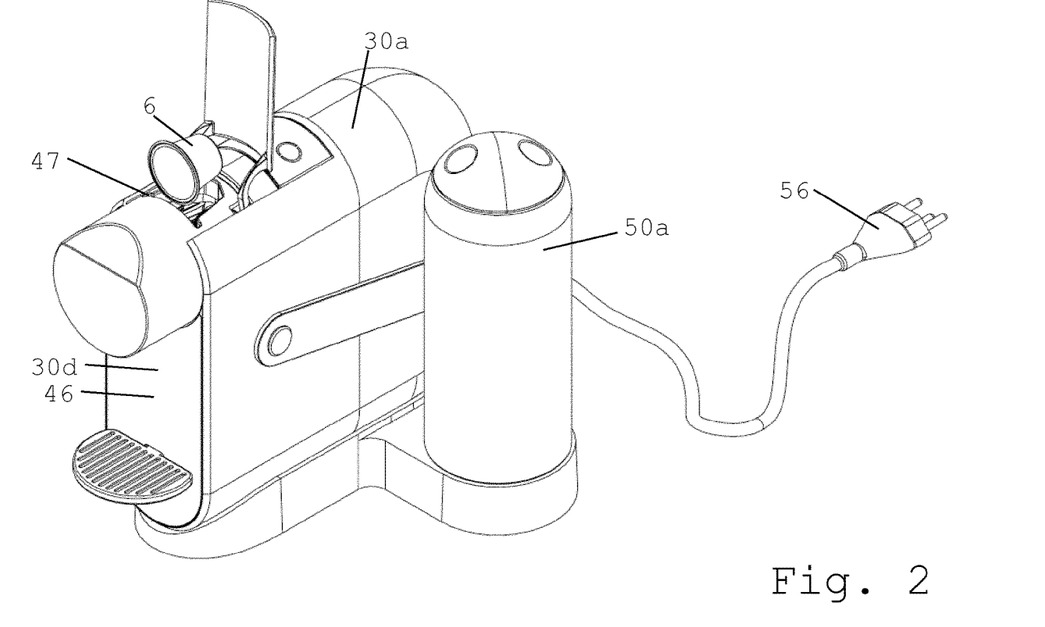
FIG. 2 is a perspective view of a variation of the machine of FIG. 1 in a configuration for receiving an ingredient capsule.
Figure 3:
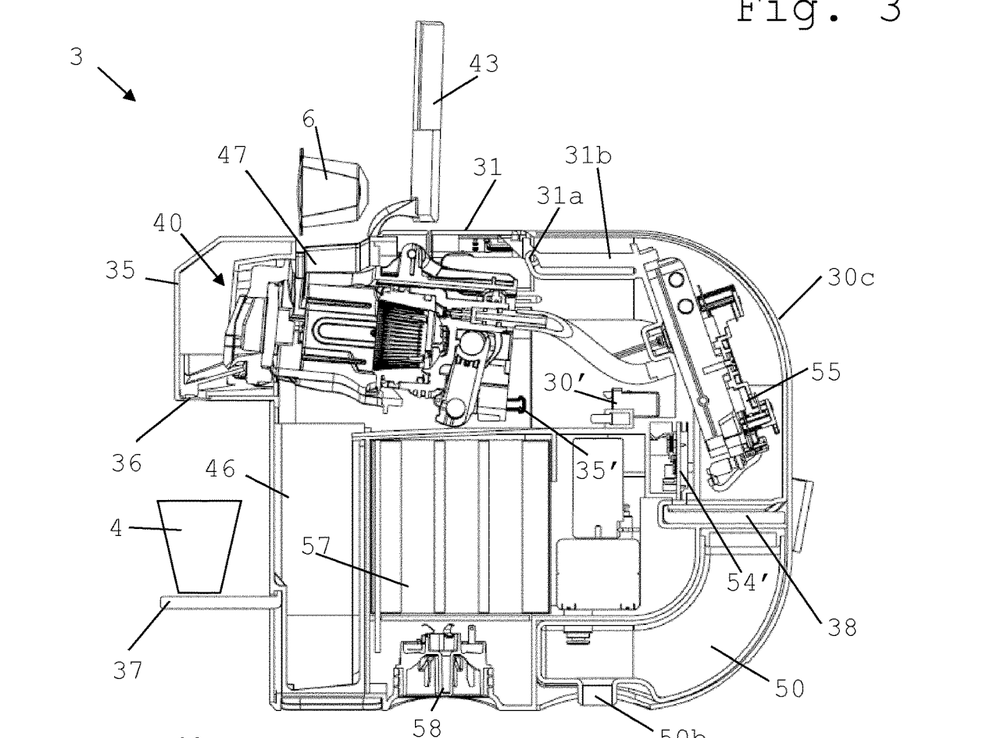
FIG. 3 is a cross-sectional view of a module of the machine of FIG. 1 or 2 in a configuration for receiving an ingredient capsule.
Figure 4:
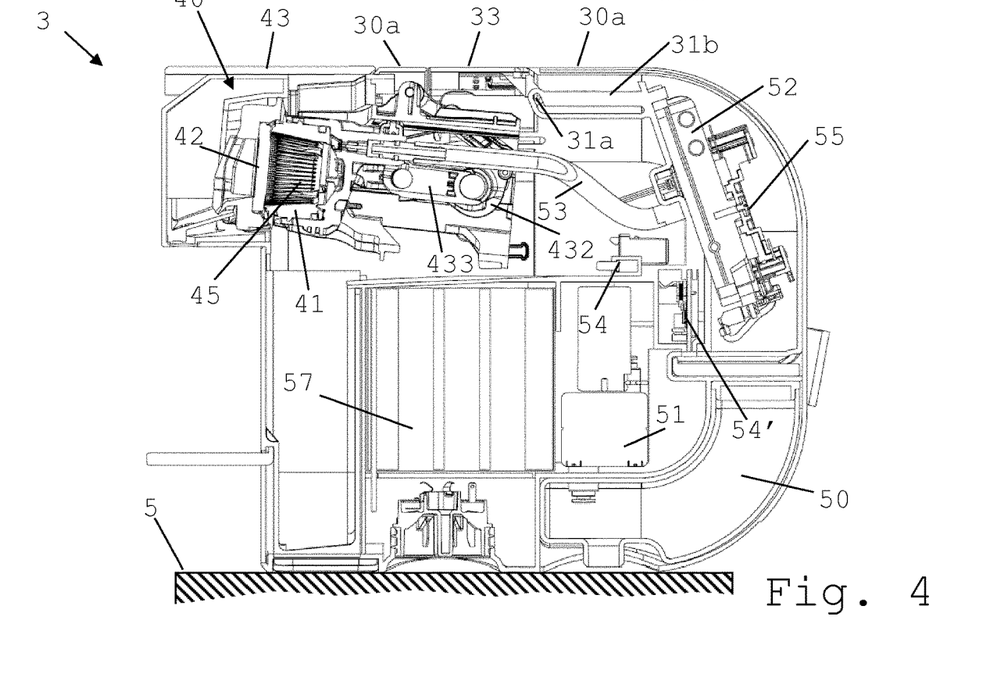
FIG. 4 is a cross-sectional view of a module of the machine shown in FIG. 1 or 2 in a closed configuration.
Figure 5:
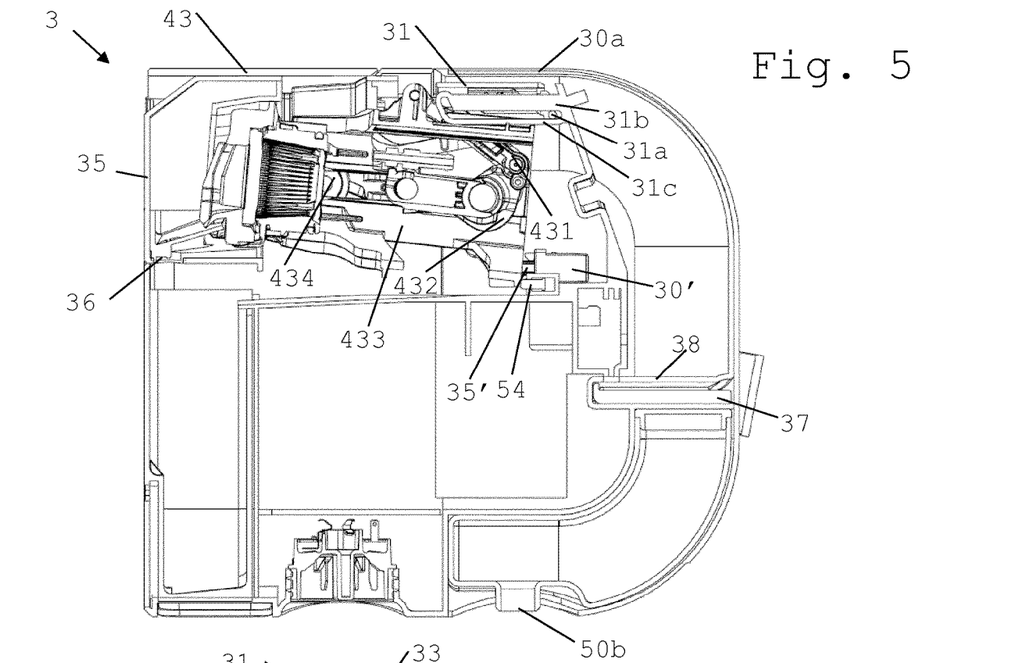
FIG. 5 is a cross-sectional view of a module of the machine shown in FIG. 1 or 2 in a compacted configuration.
Figures 6, 7, 8:
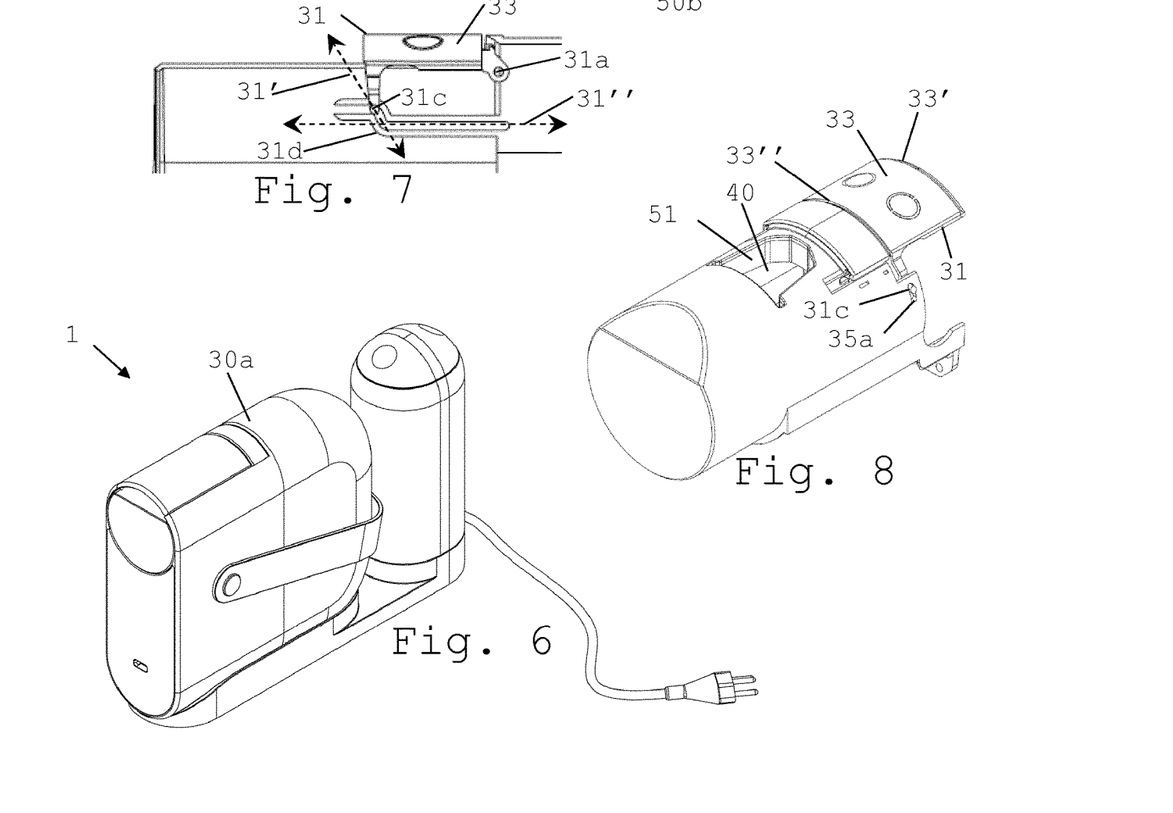
FIG. 6 is a perspective view of the machine shown in FIG. 1 in a compacted configuration.
FIGS. 7 and 8 illustrate the assembly of a user-interface device in the machine shown in any of FIGS. 1 to 6.
Figure 9:
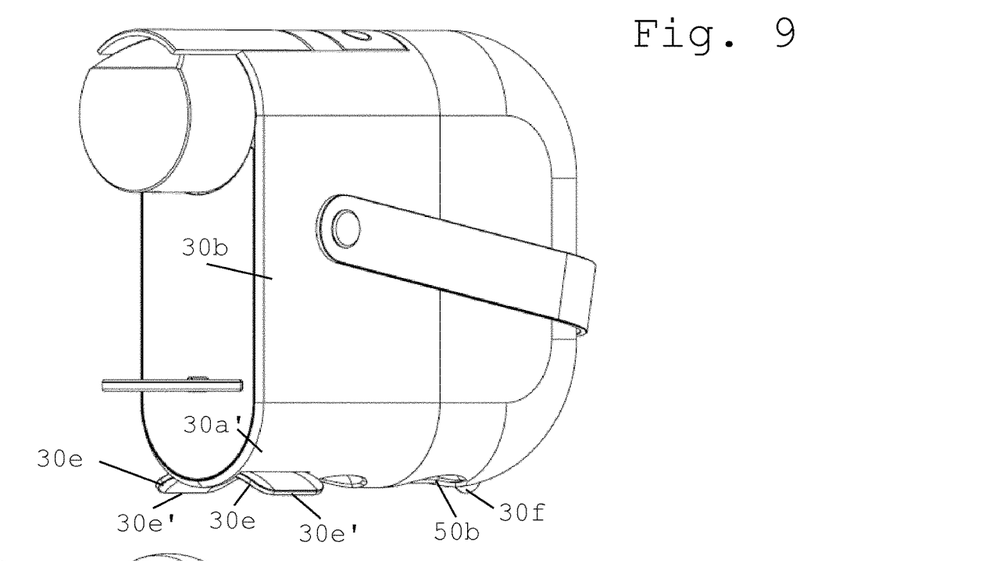
FIG. 9 is a perspective view of a module of the machine shown in any of FIGS. 1 to 8, the module having deployed placement members for placing the module on a support surface.
Figure 10:
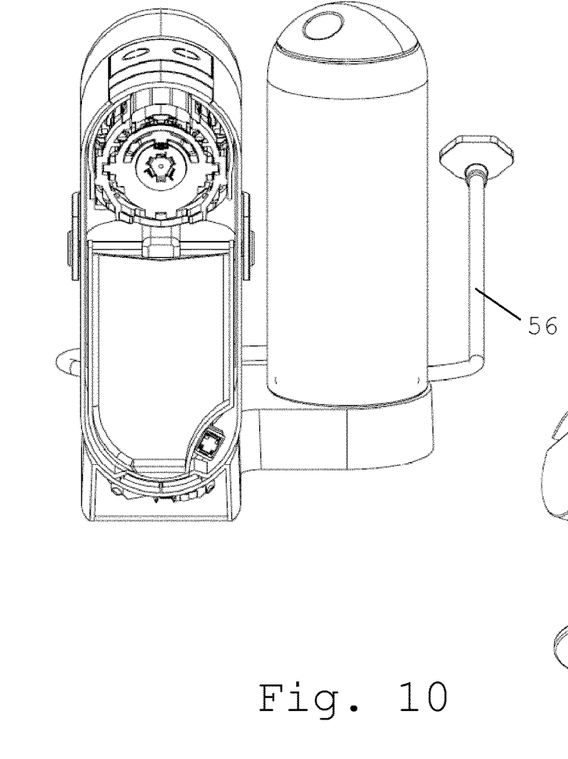
FIG. 10 is a perspective view of the module of FIG. 9 with its deployable placement members retracted.
Figure 11:
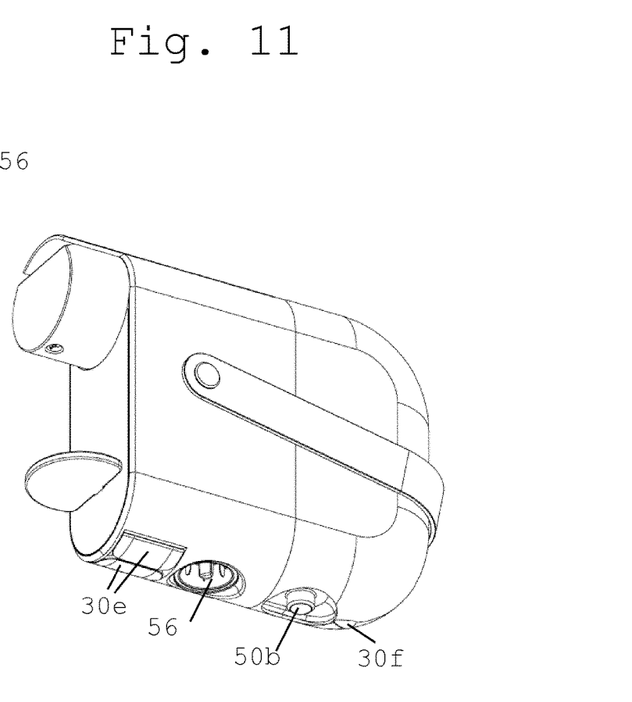
FIG. 11 is a cross-sectional front view of the machine of FIG. 2 with the module's deployable placement members retracted so that the module fits on a docking station of the machine.
Figure 12:
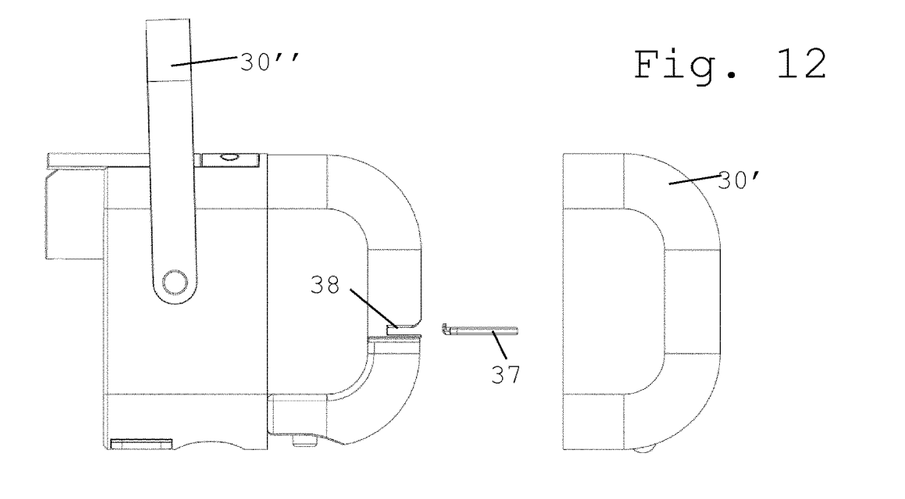
FIG. 12 is a side view of the module of the machine shown in any of FIGS. 1 to 11 in a configuration for storing a recipient support of the machine.
Figure 13:
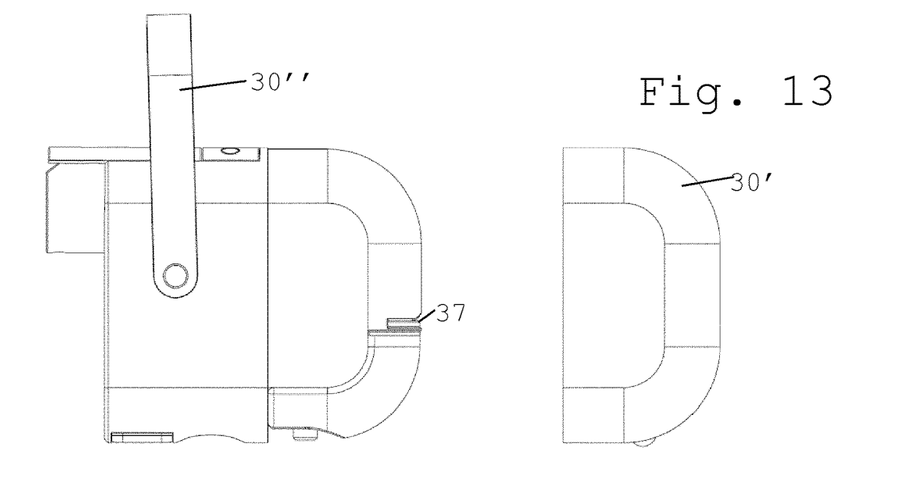
FIG. 13 is a side view of the module of the machine shown in FIG. 12 having an uncovered compartment in which the recipient support is stored.
Figure 14:
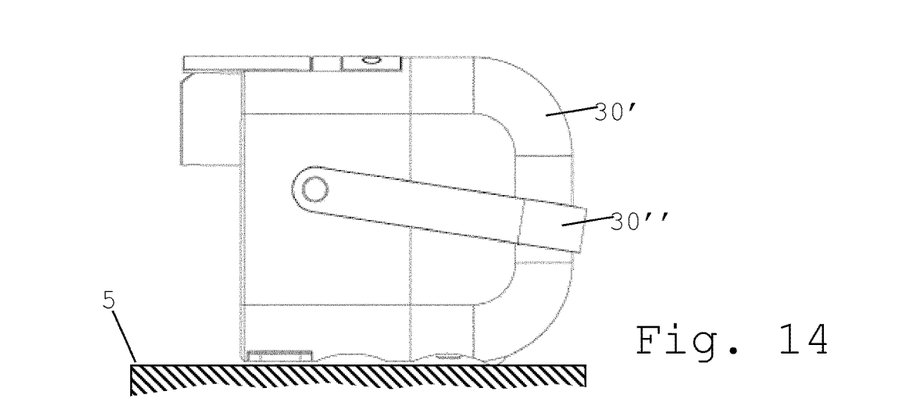
FIG. 14 is a side view of the module of the machine shown in FIGS. 12 and 13 upon covering the compartment of the recipient support with a cover.

FIGS. 1 to 14 illustrate two exemplary embodiments (with minor design differences) of a beverage machine 1 in accordance with the invention. The differences are illustrated in FIGS. 1 and 2 and relate specifically to the arrangement in machine 1 of the liquid supply arrangement 50a.

Machine 1 can be configured for preparing and dispensing a beverage, such as tea, coffee, hot chocolate, cold chocolate, milk, soup or baby food.

Machine 1 incorporates an outside housing 30 having one or more outside faces 30a,30b,30c,30d, such as one or more faces selected from a top face 30a, a side face 30b, a rear face 30c and a front face 30d.

Machine 1 includes a user-interface device 31, e.g. connected to a control unit 55 of such machine 1.

User-interface device 31 is movable: from a deployed operative position adjacent to an outside face 30a of one or more outside face(s) 30a,30b,30c so that device 31 is accessible by a user for operating such machine 1 to prepare and dispense the beverage; to a retracted storage position in outside housing 30 so that device 31 is inaccessible to a user for operating such machine 1; and/or vice versa.

Device 31 may bear one or more interface elements, such as touch elements, e.g. a button(s) 32 or a touch pad or a touch screen, and/or one or more user indicators, e.g. light means e.g. LED or signal screen.

User-interface device 31 is movable, e.g. manually and/or automatically, from its deployed operative position into its retracted storage position and vice versa along a first direction 31' and a second direction 31" that is non-parallel to first direction 31' and optionally a third direction that is non-parallel to the first and/or the second direction(s).

User-interface device 31 can be configured to be secured in its operative and/or storage positions by at least one of: a friction and/or magnetic force, clipping arrangement and locking arrangement 30',35'.

User-interface device 31 can be configured to interrupt powering of machine 1 when in or moved into the storage position. For instance, machine 1 has a power unit 54' configured to power one or more activatable units 31,40,51, 52 and comprises a main switch 54 that is directly or indirectly actuated by user-interface device 31. Activatable units 40,51,52 may include at least one of user-interface device 31, a liquid driver 51, a thermal conditioner 52 and a control unit 55.

First direction 31' may follow a movement of user-interface device 31 generally sinking into and emerging from outside housing 30, optionally first direction 31' being generally orthogonal to housing outside face 30a that is adjacent to device 31 in its operative position or at an angle to such outside face 30a that is in the range of 45 to 90 deg., such as 60 to 90 deg., e.g. 75 to deg. Second direction 31" can follow a movement of user-interface device 31 hiding behind and along housing outside face 30a that is adjacent to user-interface device 31 in its deployed operative position, optionally second direction 31" being generally parallel to outside face 30a that is adjacent to device 31 in its operative position or at an angle to such outside face that is in the range of 0 to 45 deg., such as 0 to 30 deg., e.g. 0 to 15 deg.

First direction 31' can be at a large angle relative to a main outside face 33 of user-interface device 31 in its deployed operative position, for instance a large angle in the range of 45 to 90 deg., such as a large angle of at least 60 deg., e.g. a large angle of at least or 75 or 85 deg. Second direction 31" can be at a small angle relative to a main outside face 33 of user-interface device 31 in its deployed operative position, for instance a small angle in the range of 0 to 45 deg., such as a small angle of less than 30 deg., e.g. a small angle of at less than 15 or 5 deg.

User-interface device 31 in its deployed operative position may have a main outside face 33 that is generally flush with housing outside face 30a that is adjacent to the user-interface device 31. Main outside face 33 in the deployed operative position can be predominantly surrounded, e.g. entirely surrounded, by housing outside faces 30a that are flush with the device's main outside face 33.

User-interface device 31 can be guided from its deployed operative position into its retracted storage position and vice versa by a cam-follower 31a,31c and cam 31b,31d arrangement. Cam 31b,31d may have a first section extending along first direction 31' and a second section extending along second direction 31".

User-interface device 31 may be associated with a pair of cams 31b,31d having different, sequentially off-set, profiles such that when user-interface device 31 is moved from the operative to the storage positions it has a front edge 33' that is lowered and displaced underneath outside housing 30 while a rear edge 33" of device 31, uncovered by the outside housing 30, remains above front edge 33" during a part of a movement of user-interface device 31 between the operative and storage positions.

User-interface device 31 can be coupled to a further machine part 35, e.g. a dispensing head 35 with a beverage outlet 36, that is movable between an operative position and a storage position together with user-interface device 31. User-interface device 31 can be actuated by further machine part 35 or vice versa. User-interface device 31 and further machine part 35 may be coupled together by a rigid or an articulated arrangement, such as a cam-follower 31c and cam 35a arrangement or a flexible mechanically connector or by a lever arrangement.

For instance, further machine part 35 is a dispensing head 35 with a beverage outlet 36 that is movable between an operative dispensing position in which outlet 36 is positioned above a dispensing surface 5,37 for positioning a user-cup or user-mug 4.

A dispensing surface 5 can be formed by an external placement support 5 for placing such machine 1 in position for preparing and dispensing the beverage via a beverage outlet 36.

A dispensing surface 37 can be formed by a user-recipient support device 37 of machine 1. For instance, user-recipient support device 37 is movable or removable from under the outlet 36, such as separable from a module of machine 1 and storable in a storage seat 38 of machine 1, e.g. of module 3, for instance storable in storage seat 38 and secured therein by at least one of: friction and/or magnetic force between seat 38 and support device 37; clipping or locking support device 37 in seat 38; and covering seat 38 by at least one of a door, gate, housing cover 30' e.g. a cocoon-type half shell, carrying handle 30" and belt 30".

Further machine part 35 may include an ingredient holder, such as an ingredient supply seat e.g. a water tank or an ingredient mixing unit.

Ingredient holder can form a seat 45 of an ingredient processing unit 40 of machine 1, e.g. a seat 45 formed by a chamber.

Ingredient holder may be connected to a liquid circuit comprising at least one of:
- a liquid supply arrangement 50,50a, such as a main reservoir 50 and an auxiliary reservoir 50a fluidically connected by a liquid connector 50b or a main reservoir 50 and a connector 50b to a liquid supply line;
- a liquid driver 51, such as an electric pump e.g. a solenoid pump, a rotary pump, a diaphragm pump, a positive displacement pump or a peristaltic pump, for driving liquid to outlet 36;
- a thermal conditioner 52 such as a liquid heater and/or cooler, for thermally conditioning liquid delivered by outlet 36; and
- one or more liquid ducts 53 for guiding liquid to be delivered by outlet 36.

Processing unit 40 may have a first module 41 and a second module 42 that are movable relatively to each other by an actuator between:
- a distant configuration for inserting into seat 45 and/or removing from seat 45, e.g. towards a waste ingredient collector 46, an ingredient, e.g. a flavouring ingredient supplied within a capsule 6 into seat 45 for instance via an ingredient supply channel 47; and
- a proximate configuration for processing the ingredient in seat 45.

Actuator can include at least one of:
- an automatic actuator, e.g. a motor such as an electric motor;
- a semi-automatic actuator, e.g. a return-spring arrangement for automatically returning the first and second modules either into their distant configuration or into their proximate configuration; and
- a user-handle 43, such as a handle 43 that is connected to at least one of first and second modules 41,42 and that actuates said at least one of modules 41,42 by moving handle 43 from a first position to a second position, optionally, in the operative position of further machine part 35, handle 43 in at least one of its first and second positions being flush with at least one of outside housing 30 and user-interface device 31.

The actuator can be connected to at least one of first and second modules by a transmission that comprises at least one of a belt transmission, a gear transmission, e.g. a toothed gear transmission, and a lever transmission 431,432,433, 434.

Machine 1 may have a power supply arrangement comprising a connector 56 to an external power supply, such as an electric cord and/or plug connectable to the mains, and an internal power accumulator 57, such as a rechargeable battery, for powering machine 1 to prepare and dispense said beverage when such machine 1 is not powered via connector 56, accumulator 57 being optionally charged via connector 56 when connected to an external power supply.

Machine 1 may include a docking station 2 and a module disconnectably connected, and optionally mechanically assembled, to station 2. Docking station 2 and module 3 may include at least one of:
- a station ingredient supply 50a, such as a water tank, and a module liquid connector 50b connectable to station ingredient supply 50a; and
- a station connector 56 to an external power supply, such as a station electric cord and/or plug connectable to the mains, and a module connector 58, e.g. a rigid connector stationary in the module 3, connectable to the station connector 56, e.g. a rigid connector stationary in the station 2.

Module 3 may include an arrangement for preparing and dispensing such beverage. The module may include a beverage outlet 36 for dispensing a beverage to a beverage dispensing surface 5,37 arranged for supporting a user-mug or a user-cup 4 and a liquid circuit comprising at least one of:
- a liquid supply arrangement 50, such as a main reservoir 50 fluidically disconnectably connectable by a liquid connector 50b to docking station 2, e.g. to a main reservoir 50 and/or to a liquid supply line of docking station 2;
- a liquid driver 51, such as an electric pump e.g. a solenoid pump, a rotary pump, a diaphragm pump, a positive displacement pump or a peristaltic pump, for driving liquid to outlet 36;
- a thermal conditioner 52, such as a liquid heater and/or cooler, for thermally conditioning liquid delivered by the outlet 36; and
- one or more liquid ducts 53 for guiding liquid to be delivered by outlet 36.

Module 3 can incorporate at least one of: an internal power supply 57, such as a rechargeable battery; a connector to an external power supply 56, such as a module electric cord and/or plug connectable to the mains; a control unit 55 for controlling module 3 and optionally functions contained in the docking station; and interface device 31 that is optionally connected, when present, to control unit 55.

Machine 1 may include one or more movable placement members 30e for placing such machine 1, such as a module 3 of such machine (1), onto an external, e.g. generally flat and/or horizontal, support surface 5 in an orientation for preparing the beverage in the liquid circuit and delivering such beverage via beverage outlet 36 to beverage dispensing surface 5,37. Movable placement member(s) (30e) may have:
- a deployed placement position for increasing a stability and/or safely placing such machine 1, e.g. such module 3, on external support surface 5 in an orientation for preparing and dispensing the beverage, optionally the placement member(s) 30e in the deployed placement position extending away from outside housing and/or extending laterally beyond at least one of side face 30b, rear face 30c and front face 30d; and a retracted rest position within outside housing 30 or collapsed against outside housing 30, e.g. collapsed against and extending along the outside housing 30, for:

reducing a size of such machine 1, e.g. said module 3, to displace it; and/or provide a configuration suitable for placing said module 3 onto a docking station 2 of such machine 1 and connecting module 3 to the docking station 2.

Placement member(s) 30e can be pivotably and/or translationally mounted relative to outside housing 30, for moving the placement member(s) from the deployed placement position to the retracted rest position and vice versa.

In the orientation for preparing the beverage in the liquid circuit and delivering such beverage via beverage outlet 36 to beverage dispensing surface 5,37:

the or at least one placement member 30e in the deployed placement position may extend laterally beyond a housing outside face 30b;30c,30d that extends upright above said placement member 30e such as beyond such housing outside face 30b;30c,30d by a horizontal distance of at least 3 mm such as in the range of 5 to 25 mm, e.g. 10 to 15 mm; and/or such machine 1 can have:

an overall height extending from a bottom end 30' of deployed placement member 30e to a top end of machine 1; and an overall distance spacing a housing outside face 30b;30c extending upright above placement member 30e and a housing outside face 30b;30d facing the former housing outside face 30b;30c, such that a ratio of the overall height/overall distance is of at least 1.3, such as at least 1.5, for instance at least 2, for example at 2.5, e.g. at least 3; and/or outside housing 30 can have a bottom outside face 30a' adjacent to the or at least one placement member 30e, bottom outside face 30a' having a generally convex, biconvex, multi-convex or downwardly tapered shape, such as a generally rounded shape, e.g. cylindrical, spherical, ellipsoidal, ovoidal or conical shape, and/or such as generally polyhedral shape, e.g. prismatic or pyramidal shape.

Machine 1 may have one or more stationary placement members 30f for placing such machine 1, such as a module of such machine 1, onto an external, e.g. generally flat and/or horizontal, support surface 5. For instance, machine 1 has a stationary placement member 30f protruding upright underneath such machine 1 in an orientation for preparing and dispensing the beverage.

The invention claimed is:

1. A machine for preparing and dispensing a beverage, the machine comprising:

an outside housing having one or more outside faces; and a user-interface device movable between a deployed operative position and a retracted storage position along a first direction and a second direction that is non-parallel to the first direction, the user-interface device being configured:

to be secured in the deployed operative position and/or the retracted storage position by at least one of a friction force, a magnetic force, a clipping arrangement, or a locking arrangement; and/or to interrupt powering of the machine in the retracted storage position.

2. The machine of claim 1, wherein:

the first direction follows a movement of the user-interface device generally sinking into and emerging from the outside housing; and the second direction follows a movement of the user-interface device hiding behind and along one of the one or more outside faces that is adjacent to the user-interface device in the deployed operative position.

3. The machine of claim 1, wherein:

the first direction is at a large angle relative to a main outside face of the user-interface device in the deployed operative position; and the second direction is at a small angle relative to the main outside face of the user-interface device in the deployed operative position.

4. The machine of claim 1, wherein the user-interface device in the deployed operative position has a main outside face that is generally flush with a housing outside face adjacent to the user-interface device.

5. The machine of claim 1, wherein the user-interface device is configured to be guided between the deployed operative position and the retracted storage position by a cam-follower and cam arrangement.

6. The machine of claim 5, wherein the user-interface device is associated with a pair of cams having different, sequentially off-set profiles such that when the user-interface device is moved from the deployed operative position to the retracted storage position, the user-interface device has a front edge that is lowered and displaced underneath the outside housing while a rear edge of the user-interface device, uncovered by the outside housing, remains above the front edge during a part of a movement of the user-interface device between the deployed operative position and the retracted storage position.

7. The machine of claim 1, wherein the user-interface device is coupled to a further machine part that is movable between an operative position and a storage position together with the user-interface device.

8. The machine of claim 7, wherein the further machine part is a dispensing head with a beverage outlet, wherein the operative position of the dispensing head positions the beverage outlet above a dispensing surface for positioning a user-cup or user-mug.

9. The machine of claim 7, wherein the further machine part comprises an ingredient holder.

10. The machine of claim 9, wherein the ingredient holder forms a seat of a processing unit of the machine, wherein the processing unit has a first module and a second module movable relatively to each other by an actuator between:

a distant configuration configured for inserting an ingredient into the seat and/or removing the ingredient from the seat; and a proximate configuration configured for processing the ingredient in the seat, the actuator comprising at least one of:

an automatic actuator;

a semi-automatic actuator; and a user-handle.

11. The machine of claim 1, comprising a power supply arrangement comprising a connector to an external power supply.

12. The machine of claim 1, comprising a docking station and a module disconnectably connected.

13. The machine of claim 1, comprising a movable placement member for placing the machine onto an external support surface in an orientation for preparing the beverage in a liquid circuit and delivering the beverage via a beverage outlet to a beverage dispensing surface, the movable placement member having:
- a deployed placement position configured for increasing a stability and/or safely placing such machine; and
- a retracted rest position within the outside housing or collapsed against the outside housing, configured for: reducing a size of such machine, to displace it; and/or provide a configuration suitable for placing the module onto a docking station of such machine and connecting the module to the docking station.

14. The machine of claim 13, wherein in the orientation:
the movable placement member in the deployed placement position extends laterally beyond a housing outside face that extends upright above the movable placement member; and/or
the machine comprises:
- an overall height extending from a bottom end of the movable placement member to a top end of the machine; and
- an overall distance spacing a housing outside face extending upright above the movable placement member and a facing housing outside face,
- such that a ratio of the overall height to the overall distance is of at least 1.3.

15. The machine of claim 1, comprising a stationary placement member configured for placing the machine onto an external support surface.

16. The machine of claim 1, wherein the user interface device is movable along a third direction that is non parallel to the first direction and/or the second direction.

17. The machine of claim 2, wherein the movement of the first direction is in the range of 45 to 90 degrees and the movement of the second direction is in the range of 0 to 45 degrees.

* * * * *